Jan. 12, 1971                J. MEDNEY                3,554,839
                     FILAMENT WINDING APPARATUS
Filed Oct. 2, 1967                                2 Sheets-Sheet 1

INVENTOR.
JONAS MEDNEY
BY Sherman H Barber
his ATTORNEY

Jan. 12, 1971  J. MEDNEY  3,554,839
FILAMENT WINDING APPARATUS
Filed Oct. 2, 1967  2 Sheets-Sheet 2

INVENTOR.
JONAS MEDNEY
BY Sherman H. Barber
his ATTORNEY

United States Patent Office 3,554,839
Patented Jan. 12, 1971

3,554,839
FILAMENT WINDING APPARATUS
Jonas Medney, Oceanside, N.Y., assignor to Koppers Company, Inc., a corporation of Delaware
Continuation-in-part of application Ser. No. 390,433, Aug. 18, 1964. This application Oct. 2, 1967, Ser. No. 672,361
Int. Cl. B65h *81/02*
U.S. Cl. 156—430                                       4 Claims

ABSTRACT OF THE DISCLOSURE

A circular, annular resin trough is movable axially of a rotatable mandrel and filament rovings, passing through holes in the walls of the trough, become resin impregnated before being helically wound onto the rotating mandrel. By omitting alternate rovings, a tubular cylindrical structure having a porous, basket-weave type shell may be formed.

CROSS REFERENCE TO RELATED APPLICATIONS

This application is a continuation-in-part of copending application Ser. No. 390,433, filed Aug. 18, 1964 now abandoned.

BACKGROUND OF THE INVENTION

This invention relates to filament winding and, more particularly, to an apparatus for producing filament wound, tubular resin articles.

Tubular articles such as pipe and pressure vessels are generally fabricated by winding filaments, such as glass fibers, that are impregnated with a heat hardenable resin onto a rotating mandrel. After sufficient layers of resin impregnated filaments have been wound onto, the mandrel, the wound structure is subjected to heat to cure the resin and form the article.

The prior art teaches a method for winding hollow articles that does not render the present invention obvious to one skilled in the art. Pat. 3,037,343 to Haas et al. for example, discloses method and apparatus for manufacturing hose with helical plies of fine resilient wires which are subjected to cold working (twisting) before they are wrapped on a hose carcass. In accordance with Haas et al. a multitude of wires are trained from supply spools under uniform equal tension through a wire-snapping mechanism which surrounds the hose carcass and which gathers the wires into an array converging concentrically toward the hose carcass. As the wires pass through the wire-shaping mechanism, they are given a helical twist to impart a curvature of desired pitch. The twisted wires are then wrapped on the hose carcass supported on a mandrel. The mandrel and hose carcass rotate and move laterally along a track so that, by movement of the mandrel, the wires are pulled from their supply spools through the wire-shaping mechanism and are progressively wrapped in helical convolutions upon the hose carcass.

Patent 3,202,560 to Michael discloses a rotatable mandrel and a carriage that is reciprocable alongside of the mandrel. As the mandrel rotates, glass filament rovings are pulled from spools mounted to the carriage which reciprocates along the length of the mandrel. The rovings are impregnated with resin prior to wrapping on the mandrel and thereafter the resin is cured by heat. The mandrel is arranged horizontally and the resin is dispensed from a tube onto the rovings strands simultaneously with the application of the roving strand onto the mandrel.

Patent 1,951,301 to Angier et al, discloses a rotatable frame supporting a plurality of spools of filaments that are helically wound onto a first web as it vertically moves downward. The first web and filaments are positioned between second and third opposed outer webs. An adhesive is applied to the opposed inner surfaces of the second and third outer webs, and the first web with its helical filaments and the second and third webs are thus formed into a laminate structure.

It will be recognized by those skilled in the art, from the following description, that such prior art does not render the invention described and claimed herein obvious. In accordance with the invention a mandrel rotates about a vertical axis and filamentary rovings that pass through resin in a trough surrounding the mandrel are laid on the mandrel in a helical convolution as the trough reciprocates vertically with respect to the mandrel. The rovings pass through holes in the walls of the trough and by omitting rovings from alternate holes a perforated shell may be readily constructed. When rovings pass through adjacent holes an imperforate shell is produced.

Clearly, the method and apparatus of the prior art referred to herein does not render obvious the method and apparatus hereinafter claimed.

Heretofor, filament reinforced pressure vessels, in some instances, have been formed by repetitively winding a single resin impregnated strand or roving back and forth onto a rotating mandrel; the strand being advanced axially of the mandrel by a feeding eye to provide a helical winding pattern. The single strand has a finite, rather narrow width and each time the feeding eye travels the length of the mandrel and back again a single loop of roving is laid on the mandrel. In order to form a completely wrapped article, the mandrel must be angularly indexed between winding cycles so that each successive helical loop is laid adjacent a previously arranged loop. Obviously, this requires great accuracy in winding machinery, particularly in the gear train and indexing mechanisms. Also, since only a single loop is laid on the mandrel each time the feeding eye reciprocates, many, many loops are required to form a singular laminar of the article and, additionally, many laminae are required to build up a desirable wall thickness for the article to be formed.

In some instances, heretofor, a plurality of such feeding eyes have been arranged axially of the mandrel and several loops have been wound onto the mandrel at the same time. But, in such instances, the number of cycles required to build up a desired wall thickness is still excessive, and there is considerable overlapping of filament strands at the ends of the mandrel when the feeding eye reverses direction of motion. Such overlapping and bunching-up of the strands at the end of the mandrel is undesirable in most instances.

In contrast to the foregoing, the present invention obviates the difficulties experienced with prior art apparatus and method in the manner described hereinafter.

SUMMARY OF THE INVENTION

A mandrel is rotated about an axis and filamentary rovings passing through heat hardenable resin in a trough surrounding the mandrel, are helically wound on the mandrel as the trough reciprocates axially of the rotating mandrel. The trough has holes in its walls that serve as filament feeding eyes. By feeding filaments through alternate feeding eyes a shell structure is formed that has openings in it.

DETAILED DESCRIPTION

Figure 1:
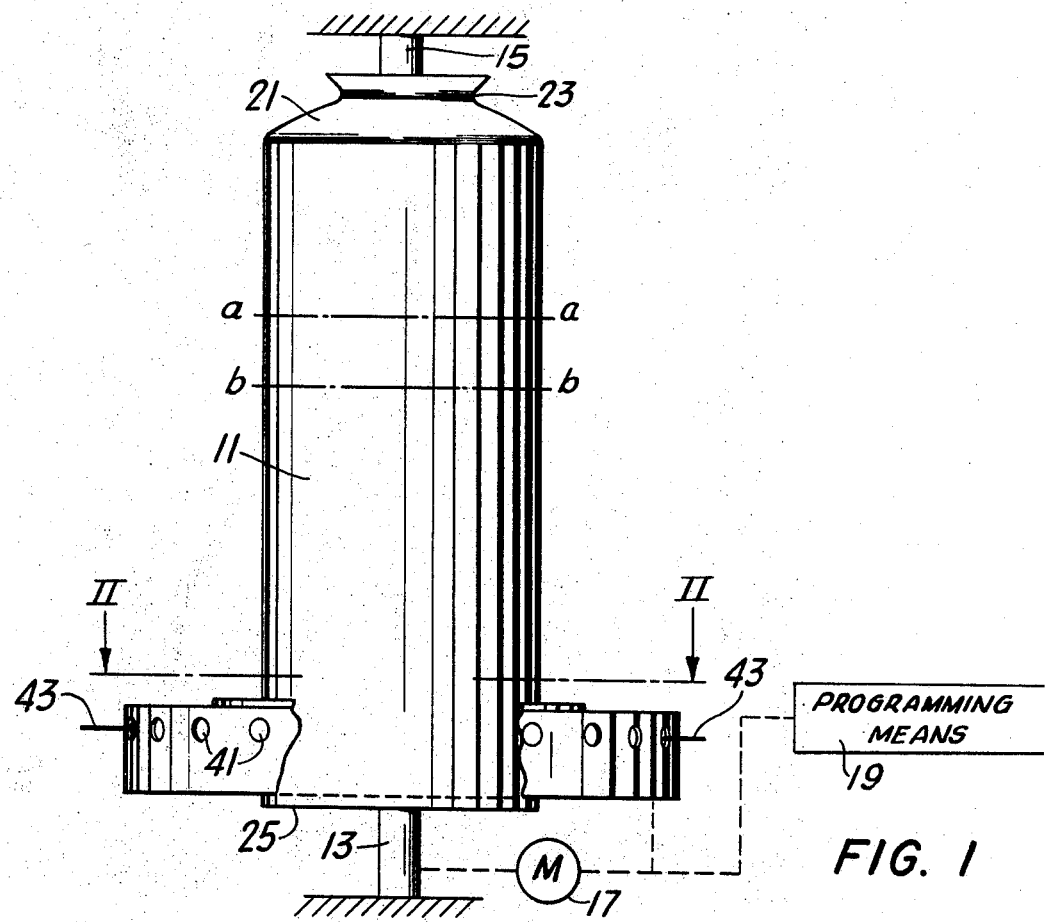
FIG. 1 is an elevational view, partly in section, of apparatus suitable for practicing the method the invention.
Figure 2:
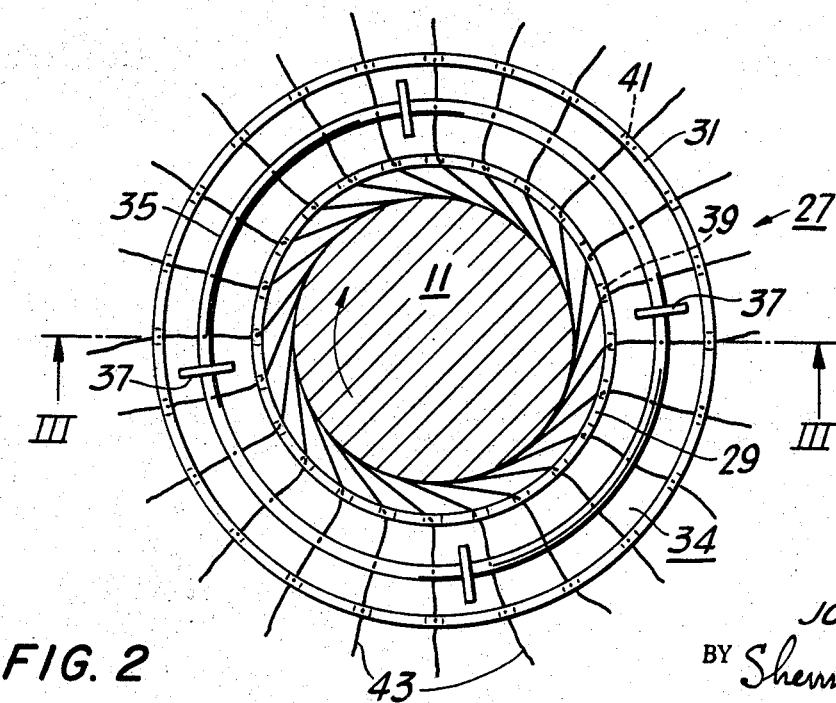
FIG. 2 is a sectional view along line II—II of FIG. 1.
Figure 3:
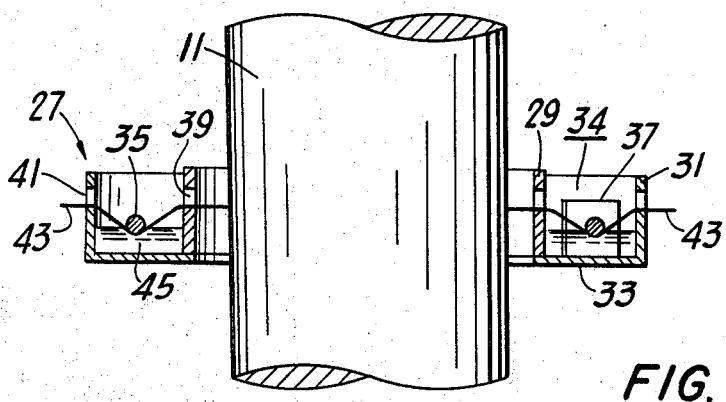
FIG. 3 is a sectional view along line III—III of FIG. 2.

Referring to FIG. 1, mandrel 11 is mounted vertically on shafts 13, 15, that are operatively connected to a rotational mechanism M, which may be an electric motor 17, that is operatively controlled by a programming means 19, which means may include a computer of a mechanical other device known to those skilled in the art and which is suitable for accomplishing the purpose mentioned hereinafter. The mandrel 11 has, at its upper end, a head portion 21 that merges with a throat portion 23, and the bottom of the mandrel 11 is shown as being angular with respect to the side wall of the mandrel. The bottom of the mandrel 11, however, may have a head and throat that are similar to the head 21 and throat 23 portions, or any other suitable form for that matter.

Surrounding the mandrel 11, in spaced apart relation thereto, is a filament feeding device 27 which comprises generally concentric inner 29 and outer 31 spaced apart walls that are connected at their lower edges by an annular bottom plate 33 to form an annular trough 34 that is adapted to hold heat hardenable resin. Within the trough 34, and spaced from the inner 29 and outer 31 walls, is a circular guide bar 35 that is mounted on supports 37 secured to the bottom plate 33 in any suitable manner. The guide bar 35 is desirably positioned above the bottom 33 and below a plurality of holes 39 in the inner wall 29, that register with holes 41 in the outer wall 31. The holes 39, 41, are generally uniformly angularly spaced apart around the inner and outer wall and, thereby, constitute a plurality of filament feeding eyes that are used in the manner described hereinafter.

The filament feeding device 27 reciprocates vertically by means of the powered mechanism M under the control of the programming means 19.

Figure 4:
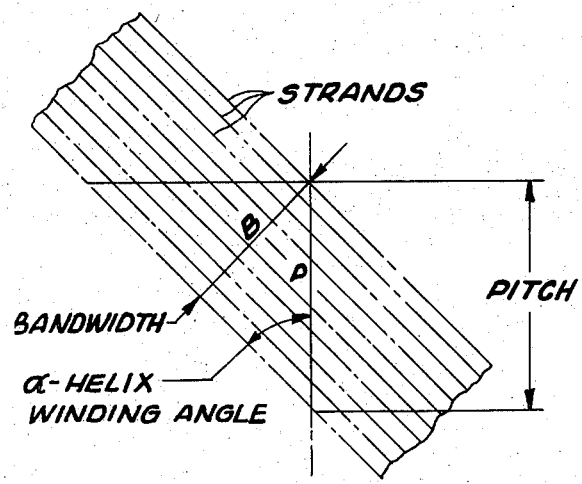
FIG. 4 schematically illustrates the interrelation of the band width and helix winding angle in structures wound in accordance with the invention.

Filament reinforcings, such as rovings 43, lead from a plurality of conventional supply spools (not shown) through the holes 41, under the guide bar 35, through the holes 39, and thence onto the rotatable mandrel surface. as the rovings 43 pass under the guide bar 35, they pass through heat hardenable liquid resin 45 in the trough 34, and thus become resin impregnated. The filament rovings 43 are applied to the surface of the mandrel 11 so as to form a band having a width, B, equal to the combined width of all of the rovings 43 passing through the holes 39, 41. Then, as the mandrel rotates and the filament feeding device 27 reciprocates vertically, the filaments 43 comprising a band of width, B, (FIG. 4) cover the mandrel surface.

In accordance with the present invention, the combined linear axial motion of the filament feeding device 27 and the rotary motion of the mandrel 11 are so timed by the programming device 19, that the several strands or rovings are helically laid on the mandrel in side-abutting relation. To effect such side-abutting relation, the filament feeding device 27 moves axially at such a rate of speed that the pitch, P, of the windings in the band is equal to the band width, B, divided by the sine function of the band helix winding angle, alpha. This relation is derived from the showing in FIG. 4. When such relation obtains, a fully closed, imperforate wall, or hollow cylindrical shell is wound on the mandrel 11, and successive passes of the filament feeding device 27, in the axial direction of the mandrel 11, increases the wall thickness of the article. Further, in accordance with the invention, the usual undesirable doubling of the strands at the ends of the mandrel, which occurs in structures wound in accordance with prior art practices, does not occur.

Figure 5:
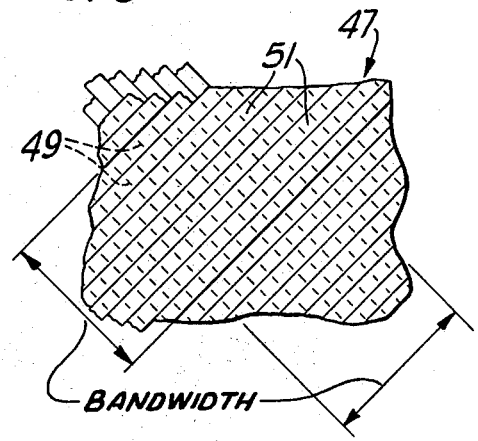
FIG. 5 is a plan vew of a portion of the surface of an article fabricated in accordance with the method of the invention.

FIG. 5 illustrates a portion of the wall of a fully closed imperforate shell 47 wound on mandrel 11 in accordance with the invention. The solid lines 51 represent the outermost layer of strands, and the dotted lines 49 represent the layer of strands immediately below the outermost layer.

Figure 6:
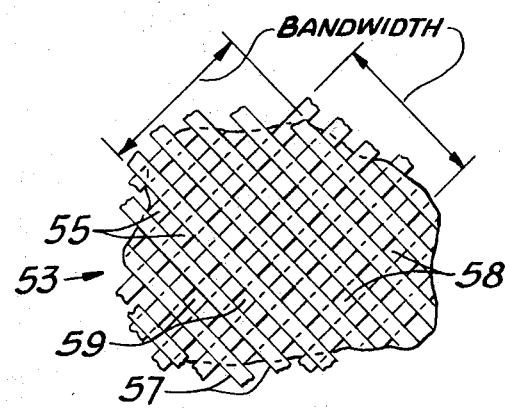
FIG. 6 is a plan view of a portion of the surface of another article fabricated in accordance with the method of the invention.

FIG. 6 illustrates a portion of the shell or tubular envelope 53 that is porous and has the appearance of a basket weave. Such structure is also produced in accordance with the method of the invention.

The portion of the shell or tubular envelope 47 illustrated in FIG. 5 is produced in the following manner. Rovings 49 are disposed in a plurality of adjacent pairs of holes 39, 41 in the filament feeding device 27, and then, when the filament feeding device reciprocates in timed relation to the rotation of the mandrel, the rovings 49 of one layer are helically arranged on the mandrel in side-abutting relation, and the rovings 51 of the next layer, which overlie the rovings 49, are also helically arranged in side-abutting relation. Because the rovings in each layer are side-abutting, holes or perforations in the shell are not formed.

The portion of the shell or tubular envelope 53 (FIG. 6) is produced in the following manner. Rovings 55 are disposed in alternate pairs of holes 39, 41, leaving the intermediate pairs of holes without rovings. Then, as the filament feeding device 27 reciprocates in timed relation to the rotation of the mandrel, the rovings 55 are helically arranged on the mandrel, but the rovings in each layer are spaced apart; the spacing between adjacent rovings being the result of not providing a roving in the intermediate pairs of holes in the filament feeding device. The rovings 55 of one layer are diagonally arranged with respect to rovings 57 of the next overlying layer, and the spaces between rovings in overlying layers create holes 59 of nearly rectangular shape in the shell 53. Then, as the rovings in alternate layers overlie in registration, the perforated shell of FIG. 6 is produced. Those skilled in the art will recognize that tubular shells having larger perforations may be constructed, in accordance with the invention by simply omitting more and more strands from the pairs of apertures 39, 41. That is to say, instead of passing rovings 43 through alternate pairs of holes 39, 41, the rovings 43 pass through every third, or fourth, or fifth pair of holes 39, 41, as desired.

The band width may be changed by passing the filamentary rovings 43 through a greater number or a lesser number of adjacent pairs of holes 39, 41. For example, the band width may be the width of a single roving 43 passing through only one pair of holes 39, 41; it may be the width of two rovings 43 passing through two adjacent pairs of holes 39, 41, or it may be equal to the width of the rovings passing through all of the pairs of holes 39, 41 around the entire circumference of the inner 29 and outer 31 walls.

The circumferential spacing of the holes in the inner 29 and outer 31 walls is related to the band width, and, if the number of ends or width of the roving changes, a different filament feeding device 27 should be used that has enough holes to accommodate the number of rovings required to provide an imperforate surface. Such surface, as mentioned before, obtains when all of the rovings in a band and all of the bands are edge abutting.

The mandrel 11 and the filament feeding device 27 are actuated by power units though in FIG. 1 only one motor 17 is shown. Each separate drive mechanism for the mandrel and for the feeding device is controlled by the single programming means 19. If, for example, it is desired to build up the wall thickness in a localized area or zone, after the shell has been produced, the programming device 19 may be set so that the filament feeding device 27 reciprocates up and down between lines A—A and B—B and adds additional rovings only in the localized zone between these lines. In this way, supports for external members, or flanges, or a locally reinforced shell area may be formed readily and quickly on the tubular article.

A feature of the invention is that filament wound tubular shells and pressure vessels may be produced more quickly and the laminar of the shells will be more uniform. There will not be the usual overlapping and bunching up of rovings at the ends of the mandrel, as in shells and vessels produced in accordance with the prior art methods.

A feature of the invention is that the same apparatus may be used to produce either perforated tubular articles or solid wall tubular articles with equal facility and dispatch.

A feature of the invention is that the filament winding apparatus thereof is considerably simpler and more adaptable than prior art apparatus for making various types of filament wound products.

Although the invention has been described herein with a certain degree of particularity, it is understood that the present disclosure has been made only as an example, and that the scope of the invention is defined by what is hereinafter claimed.

What is claimed is:
1. In filament winding apparatus, the improvement comprising:
   (a) an annular trough surrounding a rotatable vertical mandrel in spaced apart relation, said resin trough including:
      (i) a supply of heat hardenable resin in said trough;
      (ii) means for guiding a plurality of filaments in the form of rovings through the resin in said trough whereby said rovings become resin impregnated and thereafter guiding said rovings onto said mandrel;
   (b) means for reciprocating said trough axially of said mandrel as said mandrel rotates;
   (c) means for rotating said mandrel; and
   (d) means of programming the rotation of said mandrel with the axial motion of said trough whereby rovings are helically wound on said mandrel to form a tubular shell.
2. The invention of claim 1 wherein:
   (a) said trough includes:
      (i) inner and outer spaced apart walls each having therein a plurality of holes;
      (ii) a bottom connecting said inner and outer walls; with
      (iii) said rovings passing through opposite holes in said walls and in cooperation with said means for guiding said rovings through the resin in said trough.
3. Apparatus for filament winding the laminar shell of tubular articles comprising:
   (a) a mandrel rotatable about an axis;
   (b) a plurality of filament roving guides mounted around and in spaced apart relation to said mandrel, said guides lying in a plane generally transverse the axis of said mandrel;
   (c) means for rotating said mandrel about said axis;
   (d) means for reciprocating said roving guides axially of said mandrel as it rotates;
   (e) means for coating a plurality of filamentary rovings with heat hardenable resin and passing said rovings through said guides and onto the surface of said mandrel; and
   (f) means for programming the motion of said mandrel with the motion of said roving guides whereby said rovings are helically wound onto said mandrel in side-abutting relation to form a portion of a lamina of said shell each time said guides reciprocate along the length of said mandrel in one direction.
4. The invention of claim 3 wherein:
   (a) said roving guides are holes in an annular member that surrounds said mandrel in spaced apart relation and that is movable axially of said mandrel, and
   (b) said means for coating filamentary rovings includes other guides mounted to and submerged in resin in said annular member with which said rovings cooperate.

References Cited

UNITED STATES PATENTS

| | | | |
|---|---|---|---|
| 2,714,414 | 8/1955 | Ganahl et al. | 156—432 |
| 3,037,343 | 6/1962 | Haas et al. | 156—432 |
| 3,397,847 | 8/1968 | Thaden | 156—425 |

FOREIGN PATENTS

| | | | |
|---|---|---|---|
| 1,196,145 | 5/1959 | France | 156—425 |
| 524,178 | 7/1940 | Great Britain | 156—425 |
| 629,008 | 10/1961 | Canada | 156—425 |

CARL D. QUARFORTH, Primary Examiner

B. H. HUNT, Assistant Examiner

U.S. Cl. X.R.

156—425, 429